O. B. CHAMBERS.
GATE LATCH.
APPLICATION FILED FEB. 8, 1909.

952,029.

Patented Mar. 15, 1910.

WITNESSES:
John S. Murray
H. Spellman

INVENTOR
Olive B. Chambers
BY John M. Spellman
ATTORNEY

UNITED STATES PATENT OFFICE.

OLIVE B. CHAMBERS, OF WALNUT SPRINGS, TEXAS.

GATE-LATCH.

952,029.  Specification of Letters Patent.  Patented Mar. 15, 1910.

Application filed February 8, 1909. Serial No. 476,643.

*To all whom it may concern:*

Be it known that I, OLIVE B. CHAMBERS, a citizen of the United States, residing at Walnut Springs, in the county of Bosque and State of Texas, have invented certain new and useful Improvements in Gate-Latches, of which the following is a specification.

My invention relates to new and useful improvements in gate-latches.

The object of the invention is to provide a gate-latch which will never fail to catch automatically when the gate is closed.

Another object of my invention is to provide a gate-latch which can be readily released by a slight movement of the lever and one which can not be forced open by live stock.

A still further object of my invention is to provide a gate-latch which will be simple, strong, durable, efficient and one which will not be likely to get out of working order.

Figure 1:
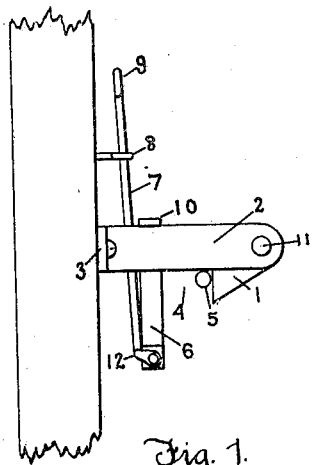
Figure 2:
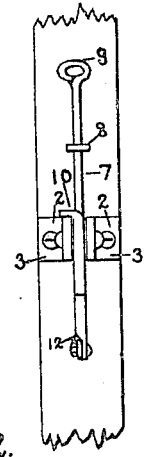
Figure 3:
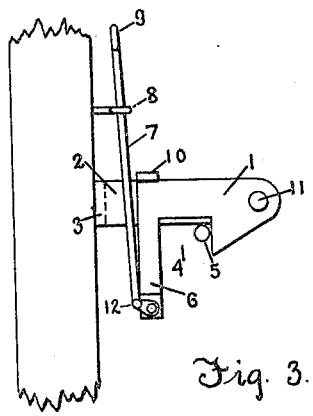
Figure 4:
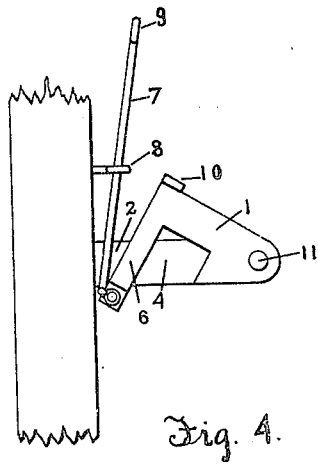

With the above and other objects in view, the invention has relation to certain novel features of construction and operation, an example of which is described in the following specification and illustrated in the accompanying drawings, wherein:

Figure 1 is a side elevation of my invention, Fig. 2 is a front elevation of the same, Fig. 3 is a transverse sectional view, Fig. 4 is a transverse sectional view, showing the latch raised.

In the drawings the numeral 1 designates a latch hook which is supported between bracket arms 2. The bracket arms 2 carry outwardly extending flanges 3 adapted to be screwed on any frame to hold the latch in position.

A recess 4 in the latch hook allows the hook to engage over a projection 5 carried by the post and prevents any pressure that might be applied to the gate from raising the latch.

The latch hook 1 carries a downwardly extending arm 6 the end of which is reduced to allow a rod 7 which is attached near its lower extremity to pass between the bracket arms 2 without striking. This rod 7, after passing through the screw eye 8 is looped to form a handle 9.

A projection 10 on the latch bends over at right angles to support the latch in its normal position and prevent it from slipping between the bracket arms 2.

At the lower extremity of the rod 7 is a shoulder 12 which prevents the latch being lifted higher than is necessary.

To release the latch the rod 7 is raised by grasping the handle 9 and latch hook 1 is raised until its lowest point is above the bracket arms 2. The latch hook being pivoted at a point 11, the weight of the arm 6 will draw the rod down and set the latch hook in position to be engaged by the projection 5.

What I claim, is:

In a gate latch, the combination with a pair of adjacent bracket arms rigidly attached to a gate post, and extending in a direction transverse with the gate, of a latch hook pivoted at its outer extremity between said bracket arms, an arm extending downwardly from the inner extremity of the latch hook, a pin carried by the gate adapted to engage said latch hook, a lever extending upwardly from the lower extremity of said downwardly extending arm, and means guiding the motion of the lever.

In testimony whereof I have signed my name to this specification in the presence of two subscribing witnesses.

OLIVE B. CHAMBERS.

Witnesses:
 LAURENCE R. WHITELEY,
 KIT C. STINEBAUGH.